W. DAVIS.
Hand-Seeder.
No. 11,032.
Patented June 6, 1854.
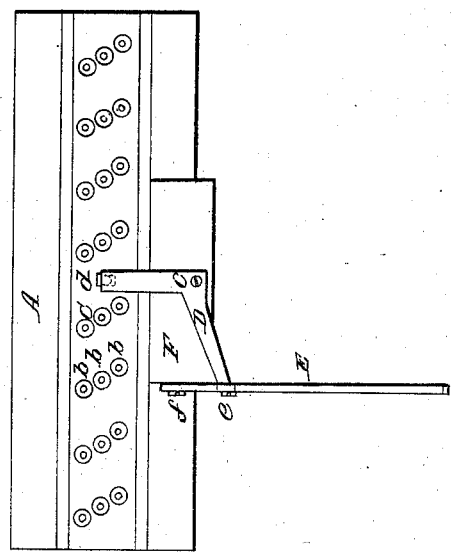
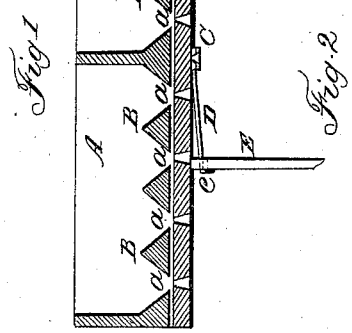
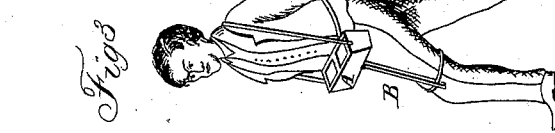

UNITED STATES PATENT OFFICE.

WAITMAN DAVIS, OF NEAR MORGANTOWN, VIRGINIA.

IMPROVEMENT IN SEED-PLANTERS.

Specification forming part of Letters Patent No. 11,032, dated June 6, 1854.

*To all whom it may concern:*

Be it known that I, WAITMAN DAVIS, of near Morgantown, in the county of Monongalia and State of Virginia, have invented certain new and useful Improvements in the Method of Operating Seeding-Machines; and I do hereby declare the following to be a full, clear, and exact description of the same, reference being had to the accompanying drawings, making a part thereof, in which—

Figure 1 represents a vertical longitudinal section through the hopper or seed-box. Fig. 2 represents a view of the bottom of the hopper or seed-box, and Fig. 3 represents the mode of connecting and operating the machine.

My invention relates to that class of machines which are operated without the use of horses, and which are carried, instead of being trundled, over the ground; and it consists in vibrating the seeding-bar by the motion of the leg of the operator in the act of walking by means of a rod attached to the leg and a bell-crank lever attached thereto and to the seeding-bar, or other equivalent means.

To enable others skilled in the art to make and use my invention, I will proceed to describe the same with reference to the drawings.

The hopper or seed-box A may be constructed in any well-known manner, and is provided with a series of transverse bars, B, whose inclined sides direct the grain to the openings $a$ in the bottom of said hopper or seed-box.

In suitable guides or supports underneath the hopper is placed the seeding-bar C, which is provided with a series of holes, $b\ b\ b$, inclined to the vibratory motion or direction of the seeding-bar, so that by means of a stop or regulator attached to the hopper, one two, or the whole of said openings may pass and repass the slots or openings in the bottom of the hopper, and thus drop less or more seed, as may be desired.

A bell-crank or L-shaped lever, D, is pivoted to the bottom of the hopper at $c$, one arm of which is connected to the seeding-bar C at $d$, and the other arm is attached at $e$ to a lever, E, which is pivoted to the seeding-box, or a projection, F, thereon, at $f$. The projection F presses against the body of the operator and tends to keep the hopper in its upright position.

The hopper may be strapped to or supported by the operator by means of straps passing around his body and over his shoulders, one or both, as seen in Fig. 3. When thus suspended or carried the lever E hangs down in front of one of his legs, and the lower end of said lever may be strapped or in any other manner secured to the leg of the operator. The act of walking oscillates the lever E, and by means of the bell-crank lever D gives a reciprocating motion to the seeding-bar C in a direction at right angles to that of the lever E.

Having thus fully described the nature of my invention and shown how the same is operated, what I claim therein as new, and desire to secure by Letters Patent, is—

The operating of the seeding-bar of seeding-machines by means of a bell-crank and lever when said lever receives its motion from the leg of the operator in the act of walking, substantially in the manner and for the purpose set forth.

WAITMAN DAVIS.

Witnesses:
MARSHALL M. DENT,
E. T. FITCH.